United States Patent [19]

Tomasi

[11] Patent Number: 5,046,010

[45] Date of Patent: Sep. 3, 1991

[54] FIXED-ECHO CANCELLING RADIO ALTIMETER AND METHOD OF OPERATING SAME

[75] Inventor: Jean-Pierre Tomasi, Brive, France

[73] Assignee: U.S. Philips Corporation, New York, N.Y.

[21] Appl. No.: 452,985

[22] Filed: Dec. 19, 1989

[30] Foreign Application Priority Data

Dec. 20, 1988 [FR] France ................. 88 16839

[51] Int. Cl.$^5$ .................................. G01S 13/34
[52] U.S. Cl. ................... 364/433; 340/970; 342/122
[58] Field of Search .......... 364/424.06, 433, 434; 340/970; 342/120-122

[56] References Cited

U.S. PATENT DOCUMENTS

| | | | |
|---|---|---|---|
| 3,889,104 | 6/1975 | Smith | 364/562 |
| 4,633,253 | 12/1986 | Stove et al. | 342/162 |
| 4,698,635 | 10/1987 | Hilton et al. | 342/42 |
| 4,766,436 | 8/1988 | Crepin et al. | 342/122 |
| 4,947,354 | 8/1990 | Hethuin | 364/562 |

FOREIGN PATENT DOCUMENTS

| | | |
|---|---|---|
| 0099160 | 1/1984 | European Pat. Off. |
| 0270148 | 6/1988 | European Pat. Off. |
| 0312180 | 4/1989 | European Pat. Off. |
| 56-164971 | 12/1981 | Japan |

Primary Examiner—Thomas G. Black
Attorney, Agent, or Firm—Leroy Eason

[57] ABSTRACT

A low altitude radio altimeter of the FM/CW type which transmits a sawtooth frequency wave and has a transmitting and a receiving aerial. A beat frequency signal $Fb_t$ between the transmitted and received waves is produced at the output of a mixer. The altimeter includes means for digitizing $Fb_t$ at the rate of n samples per sawtooth, a first memory (M1) to store $n \times k$ samples $S_j^i$ (where i varies from 1 to k and j varies from 1 to n), a second memory (M2) to store n sums $$\sum_{i=1}^{k} S_j^i,$$

first computing means (PR) for determining $$\frac{1}{k} S_j^i,$$

representative of $Fb_4$, for storage in a third memory (M3), and additional computing and storage means (PR, M4) producing difference signals $Fb_t - Fb_f$.

9 Claims, 2 Drawing Sheets

FIXED-ECHO CANCELLING RADIO ALTIMETER AND METHOD OF OPERATING SAME

BACKGROUND OF THE INVENTION

1. Field of the Invention

The invention relates to a fixed-echo cancelling radio altimeter for measuring low altitudes, which comprises a modulator-controlled generator for producing a linearly frequency-modulated signal in the form of identical sawteeth separated by plateaus, transmission means for transmitting to the ground a wave corresponding to the signal from said generator, receiving means for receiving the reflected wave, a mixer for forming a beat frequency signal $Fb_t$ between the transmitted and received waves, said beat frequency signal being representative of the accumulation of the fixed and mobile echoes between the signals.

2. Description of the Related Art

FM/CW radio altimeters essentially as described in the preceding paragraph are well-known in the field of distance meters in general, and more particularly for measuring the height (altitude) H above ground of an aircraft in which they are installed. If the sawteeth have fixed values, the frequency fb of the signal $Fb_t$ forms a direct measurement of the desired altitude H according to the conventional formula:

$$H = \frac{cT1}{2\Delta F} fb \qquad (1)$$

where:
- c: velocity of an electromagnetic wave in the air,
- T1: duration of the sawtooth,
- $\Delta F$: frequency sweep of the transmitted signals (wobbling frequency).

Formula (1) is obtained, for that matter, by eliminating $\tau$ in the following equations:

$$fb = \frac{\tau \Delta F}{T1} \qquad (2)$$

and $$\tau = \frac{2H}{c} \qquad (3)$$

$\tau$ being the delay between a transmitted wave and the received echo wave.

This mode of operation, which achieves a very simple structure of the radio altimeter, is very suitable for digitally processing the sampled signal $Fb_t$ by means of a time-frequncy transformation such as, for example, a Fourier transform, because the frequency fb characteristic of the echo from the ground to be isolated can generally be easily recognized in the spectrum obtained for the signal Fb.

However, a fundamental problem still resides in the technique mentioned hereinbefore or other techniques including analog processing of the signal which arises in measuring very small altitudes, typically below 6 m. In this case, the mobile echoes, that is to say, in the case of a radio altimeter the echoes from the ground, and the fixed parasitic echoes provide signals having adjacent frequencies in the beat frequency signal $Fb_t$ and comparable amplitudes. The fixed echoes are essentially those produced by the superstructures of the aircraft, more particularly the landing gear, and those echoes resulting from interference due to local oscillation in the aerial system, that is, the parasitic coupling between aerials if a radio altimeter has two aerials, or the parasitic reflection of the transmitted signal on the aerial connector if a radio altimeter has a single transmitting-receiving aerial. At altitudes exceeding 6 m, the frequencies of the components of the signal $Fb_t$ which result from mobile and fixed echoes, are far apart for the latter to be eliminated by frequency filtering. This problem becomes complicated because the position of the aerial on the fuselage of an aircraft, such as a military aircraft or specifically a missile, is important and it may be impossible to place the aerial system in an optimal way in the shelter of any superstructure of the aircraft and because the aerial system is desired to be as compact as possible. The best solution to ensure this compactness is obviously to use a single transmitting-receiving aerial, but the above parasitic reflection on the aerial is then so strong that measuring short distances is virtually made impossible, because the useful part of the signal $Fb_t$ then virtually drowned in the parasitic signal caused by the fixed echoes, the spectrum of the signal $Fb_t$ then being partly degraded with such short distances. For a two-aerial radio altimeter, to which this invention is directed, according to the prior art a decoupling of 70 dB must be maintained, that is to say, a distance of about 50 cm between the aerials in order to obtain a ratio of the useful signal to the parasitic signal caused by fixed echoes which is sufficiently high compared to the beat frequency signal at distances below 6 m.

This invention proposes to apply the principle of fixed-echo cancellation (Mobile Target Indicator or MTI) to a radio altimeter of the FM/CW type so as to clear the beat frequency signal $Fb_t$ at low altitudes. A distance measuring system of the FM/CW type applying the MTI principle is disclosed in published European Patent Application No. 0 099 160. However, said European Application differs from the present invention and leads to a different solution because the system therein is a radar for detecting from various moving targets, generally at high speeds, distances to be measured which are large, making it possible to use a single aerial. In addition, that system concerns resolving the problem due to the Doppler effect caused by the moving targets, which problem does not occur for a low-altitude radio altimeter. In the moving target indication system of said European Patent Application it is provided, for echo cancellation, to make a distinction between two successive echoes, that is, to use the difference between the beat frequency signals of two consecutive sawteeth as a useful beat frequency signal.

SUMMARY OF THE INVENTION

It is an object of the present invention to realise a two-aerial FM/CW radio altimeter which enables measurement of low altitudes.

It is a further object of the invention to realise a two-aerial FM/CW radio altimeter in which the decoupling between the aerials is less than 50 dB but nevertheless enables measurement of altitudes below 6 m.

A still further object of the invention is to realise a two-aerial FM/CW radio altimeter for which the aerials are in contact with each other and which nevertheless enables measurement of altitudes below 6 m.

Yet another object of the invention is to permit installation of the aerial system in a position on the aircraft ffuselage with respect to which aircraft superstructures may be in the radiation pattern of the aerial system.

These objects are achieved and the disadvantages of the prior art are mitigated by a radio altimeter in accordance with the invention in that it comprises digitising means, sample storage and computing means, as follows by:

digitising means to sample said signal $Fb_t$ during each of the sawteeth, at fixed time intervals relative to the start of each sawtooth, with n samples per sawtooth;

a first memory to store the n×k samples of k successive sawteeth: $S_j^i$, where i varies from 1 to k and j varies from 1 to n;

a second memory to store n sums, each sum being the accumulation of k samples of the same running number, corresponding to k sawteeth:

$$\sum_{i=1}^{i=k} S_1^i, \ldots, \sum_{i=1}^{i=k} S_n^i;$$

first computing means to compute the n mean values of the above sums, such mean values being representative, fixed echoes $Fb_f$:

$$\frac{1}{k}\sum_{i=1}^{i=k} S_1^i, \ldots, \frac{1}{k}\sum_{i=1}^{i=k} S_n^i;$$

a third memory to store said n mean values $$\frac{1}{k}\sum_{i=1}^{i=k} S_j^i;$$

further computing and storage means to compute and supply at the output the differences $Fb_t - Fb_f$ representing the mobile echo signals $Fb_m$.

According to a preferred embodiment of the invention the further computing and storage means are constituted by:

second computing means to compute n×m differences (m≦k):

$$S_1^1 - \frac{1}{k}\sum_{i=1}^{i=k} S_1^i, \ldots, S_n^1 - \frac{1}{k}\sum_{i=1}^{i=k} S_n^i;$$

$$S_1^2 - \frac{1}{k}\sum_{i=1}^{i=k} S_1^i, \ldots, S_n^2 - \frac{1}{k}\sum_{i=1}^{i=k} S_n^i; \ldots;$$

$$S_1^m - \frac{1}{k}\sum_{i=1}^{i=k} S_1^i, \ldots, S_n^m - \frac{1}{k}\sum_{i=1}^{i=k} S_n^i;$$

a fourth memory to store and supply at its output the aforesaid n×m differences, which represent the mobile echoes $Fb_m$ for m successive sawteeth.

The invention is based on the observation that for a given abscissa value of each sawtooth, that is to say, for a particular time interval after the start of each sawtooth, the component representative of the fixed echoes in the beat frequency signal is always the same as regards phase and amplitude. Conversely, the component caused by the mobile echoes varies for a given abscissa from one sawtooth to the next in an almost random manner and, so if the mean value of this component is taken over a sufficiently large number of sawteeth, it will be found that as a first approximation this mean value tends towards zero The variation described in the preceding paragraph may result from an altitude variation causing a slow phase variation of the mobile echo components from one sawtooth to the next, and in this respect it should be observed that a phase rotation equal to $2\pi$ during a certain number of sawteeth will suffice so that the mean value of the mobile echoes is zero as a first approximation. However, even at a constant altitude, the variation described in the preceding paragraph, which constitutes noise added to the useful component which one wants to measure, still occurs as the result of a scintillation of the ground echoes or irregularities in the level of the ground and is usually cancelled.

The sample storage and computing means are preferably constituted by a processor and four RAMs.

BRIEF DESCRIPTION OF THE DRAWINGS

The following description, referring to the accompanying drawing Figures, will provide a better understanding of the invention by way of example, in which.

DESCRIPTION OF THE PREFERRED EMBODIMENTS

Figure 1:
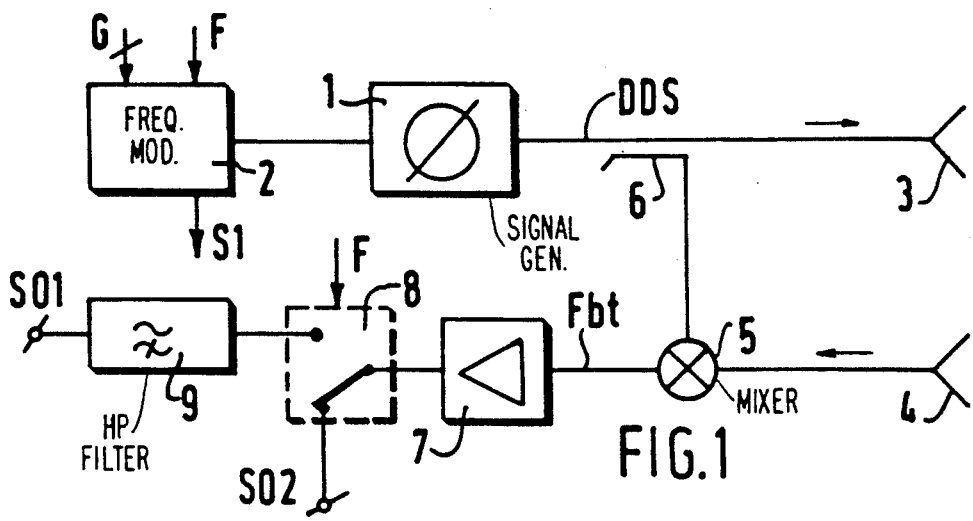
FIG. 1 is the block diagram of a two-aerial FM/CW radio altimeter comprising a two-way switch for directing the beat frequency signal to a fixed-echo cancelling unit and intended to measure low altitudes according to the invention.

The radio altimeter shown in FIG. 1 comprises a signal generator 1 controlled by a modulator 2 to supply to transmission means (transmitting aerial) 3 a linearly frequency-modulated signal DDS in the form of identical sawteeth separated by plateaus. The generator 1 is preferably a voltage-controlled oscillator and the signal DDS of the form shown in FIG. 3, which is the same form as the voltage signal at the output of the modulator output 2. This represents the frequency variation of the high-frequency output signal of the generator 1, for example, in the form of positive-edge sawteeth separated by plateaus. The transmission frequency f is of the order of several GHz and the fixed frequency sweep ΔF of the order of several hundred MHz. The transmitted signal is directed by the transmission means constituted by the transmitting aerial 3 towards the ground, and is a wave which, after reflection from the ground, is captured by receiving means constituted by the receiving aerial 4. The latter also captures echoes called fixed echoes caused by reflections from the adjacent superstructures of the aircraft, such as the landing gear, for example, or by a direct reception of the transmitted wave by parasitic coupling of aerials 3 and 4. The echoes captured by the aerial 4 are supplied to a mixer 5 whose second input receives part of the local oscillation signal extracted, for example, by means of a coupler 6 through the transmission channel of the radio altimeter. The mixer 5 produces at its output a subtractive beat frequency signal $Fb_t$ whose frequency $fb_t$ is representative of the accumulation of fixed and mobile echoes mentioned hereinbefore. The signal $Fb_t$ is amplified by an amplifier 7 and then supplied to a two-way switch 8.

For altitudes called high, that is to say, those exceeding a threshold SE of the order of 6 m, under the control of a logic signal F the switch 8 has the position opposite to that represented in FIG. 1 and the radio altimeter operates in a conventional prior-art manner. For example, the amplified signal $Fb_t$ is transmitted to a high-pass filter 9, which filters out the components representing the fixed echoes, and is then transmitted to a connection terminal SO1. From this terminal SO1 the thus cleared beat frequency signal is supplied in analog form to the processor 11 shown in FIG. 4 for calculating therefrom the altitude H. This calculation may be carried out in a known manner in analog or digital form, and the processor 11 provides at its output a signal MH representing the altitude H being measured. Processor 11 also supplies to modulator 2 two logic signals G and F. The signal G is encoded into a number of bits and makes it possible to vary range of in steps the duration T1 of the sawtooth wave DDS as a function of the range of altitudes to be measured. The signal F, which may assume the logic value 0 or 1, changes state when the thresehold SE marking the low altitudes is exceeded. If $H<SE$, the signal F causes the switch 8 to assume the position represented in FIG. 1 (signal $Fb_t$ produced at a connection terminal SO2), and also assigns to each sawtooth of the signal DDS a constant period of time T1. The fixed periods T2 is the duration of the plateau succeeding T1, and Tr is the sum of the two preceding periods or the repetition time of the sawtooth.

Figure 3:
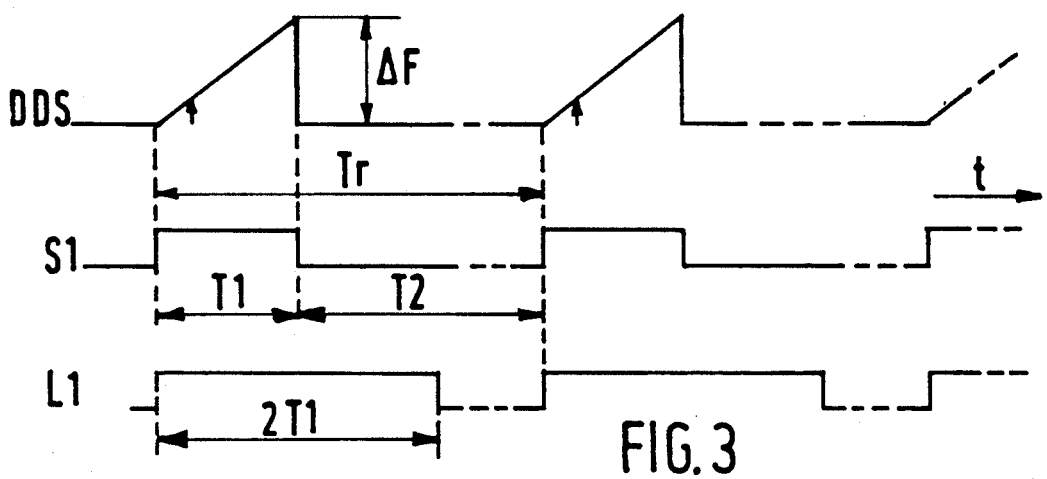
FIG. 3 is a time diagram for different signals generated by the circuits of the FIGS. 1 and 2.

FIG. 3 also shows a signal S1. This signal S1 is produced by modulator 2 and is a logic signal which assumes the value "1" for the period of time T1 and the value "0" for T2, the duration of the plateau.

Figure 2:
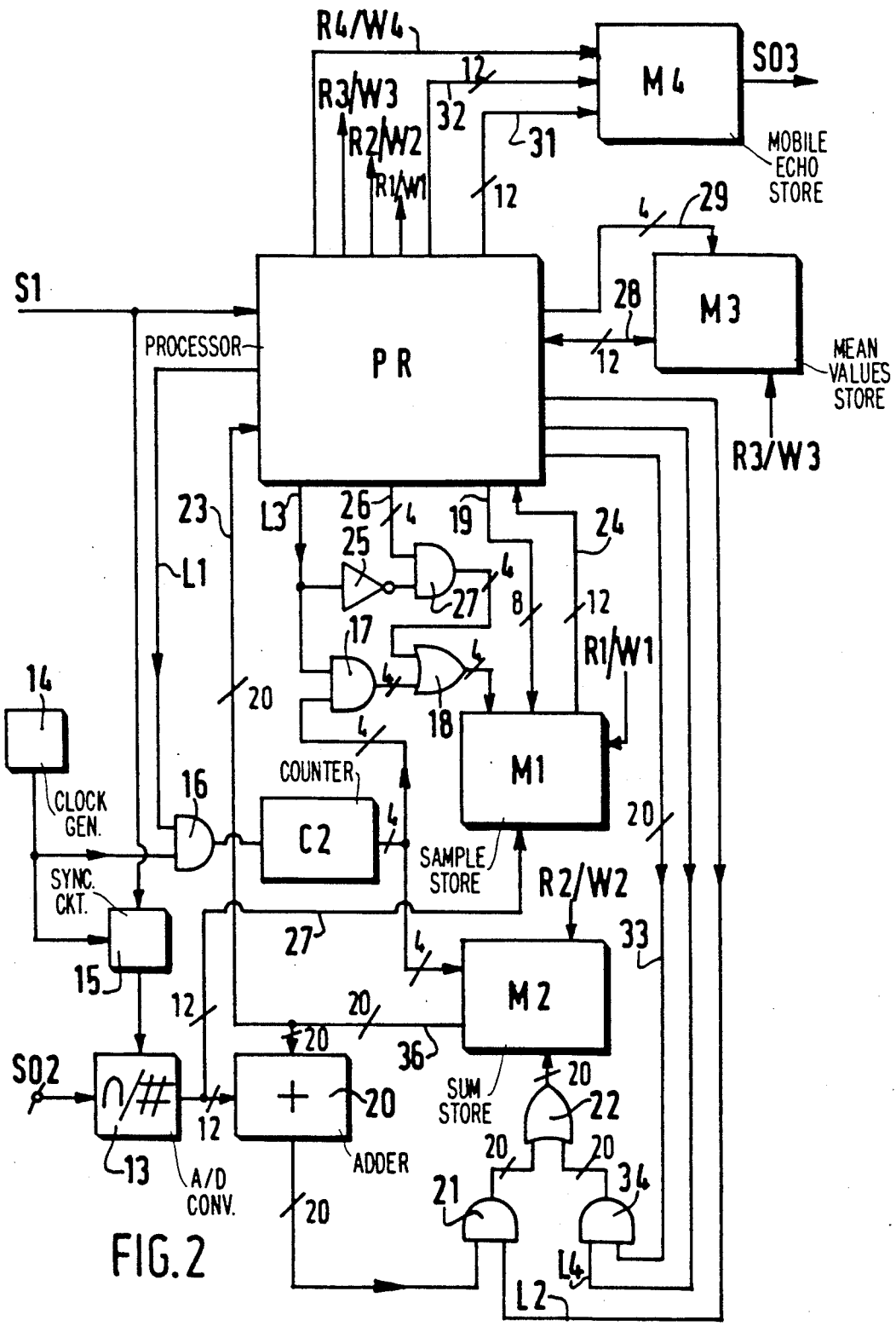
FIG. 2 represents an embodiment of the unit for cancelling fixed echoes in the beat frequency signal and intended to measure low altitudes according to the invention.

FIG. 2 shows a circuit for cancelling fixed echoes according to the invention, constituted by digitising means, means for sample storage and computing means. At input terminal SO2 is recieved the amplified analog beat frequency signal $Fb_t$. At output terminal SO3 is produced, in digital form, the signal $Fb_m$ which is representative of the signal $Fb_t$ cleared of fixed echoes, that is to say, representative of a mobile echo (in essence the signal caused by the echo from the ground).

The fixed echo cancelling circuit of FIG. 2 comprises:

a processor PR, for example, a microprocessor receiving the signal S1;

an analog-to-digital converter 13;

a first Random Access Memory (RAM) M1, for storing in k zones the samples received from the A/D converter 13 during the period of time D of k consecutive sawteeth, where k is a number of the order 100 to 300, preferably equal to 128 or 256, at a rate of n samples per sawtooth, where n is, for example, equal to 15;

a second RAM, M2, for storing n sums, each sum being the accumulation of k samples of the same running order;

a third RAM, M3, for storing the sums contained in M2 after division by k, which produces a very good approximation of fixed echoes during the period of time D;

a fourth RAM, M4, storing at the n locations of each of the m zones ($m \leq k$) the differences in value between the n samples contained in each zone corresponding with M1 and the n samples contained in M3.

Before describing in more detail the specific embodiment of FIG. 2 the operating principle and algorithm of the MTI used according to the invention in an FM/CW radio altimeter will be set out hereinbelow.

During the observation time D, comprising k sawteeth (D being of the order of 0.1 s), the beat frequency signal is digitised and stored. Subsequently, the processor computes a mean signal. For this purpose, all the corresponding points of the k sawteeth are added together (as regards voltage) and the sum obtained is divided by k so that, if the beat frequency signal is repeated in the course of the k sawteeth (in case the aircraft is standing still), the mean signal resulting from the operation is an identical signal. Then, for each sawtooth, the mean signal obtained during the period of time D is subtracted from the real signal obtained during this sawtooth. The difference is representative of mobile echoes. Having thus isolated these digital mobile echoes, it will be possible to carry out all the computations and conventional operations which enable to compute the corresponding distances as will be described hereinbelow, carried out by processor 11 of FIG. 4.

Cancelling fixed echoes is only useful if the altitude of the aircraft is very low, less than 20 feet, for example. Above this altitude the fixed echoes can be cancelled in a simpler manner by frequency filtering. On the ground, when the aircraft is standing still, all the echoes are fixed. It is thus impossible to measure with the MTI and the radio altimeter is to be informed thereof, because it receives the air/ground signal F already available on board; otherwise this non-operational situation could be confused, for example, with the situation of the aircraft flying on its back, which would give rise to a false alarm. By means of the control signal F the MTI is put into operation when the aircraft takes off and is stopped when the altitude exceeds 20 feet. It is then started again each time the altitude drops below 20 feet.

The MTI operating algorithm is the following:

The modulation sawteeth have a fixed duration, for example: $T1 = 60$ μs. They are separated by plateaus of a fixed duration, for example: $T2 = 500$ μs. The sawteeth are counted once the MTI has been put into operation. For this purpose, a first counter C1 (not separately shown) can be used which may be realised as a hardware logic circuit or in software, and which is able to count to at least 256. The beat frequency signal is digitised. The sample frequency fs is, for example, equal to 250 kHz (that is a sample every other 4 μs). Digitisation is effected by means of a 12 or 8-bit analog-to-digital converter. With the digital values indicated hereinbefore there are thus 15 samples per sawtooth ($n=15$). The start of each sawtooth is of necessity synchronized with clock pulses of 250 kHz so that the sampling instants always occur with the same delay relative to the start of the sawtooth. During each sawtooth the n samples are counted by a counter C2, which is also realised as hardware or software. The counter C2 is reset to zero before the start of each new sawtooth. In the first RAM, M1, all the samples are stored under control of the processor PR. This memory M1 therefore has 256 zones of 15 numbers each. Each zone contains the digital values of the 15 samples of each sawtooth. The write addresses are provided by the counters C1 and C2.

According to a first preferred variant, when M1 is full, the zone corresponding to the oldest sawtooth is deleted in order to be used again and so on for each sawtooth.

In the second RAM, M2, the processor records the sum of all the samples of the same running number as they arrive at the addresses of the counter C2. Thus, in M2, there are 15 numbers ranging from 1 to 15 of which number encoded in 20 bits (or 16 bits) is the sum of all the samples of the successive sawteeth, up to k sawteeth (k=256 in this example) having the same running number.

According to the first variant described hereinbefore, when the recording of an old sawtooth in M1 is to be deleted, each of these samples of each sum in M2 is subtracted beforehand. At the end of each sawtooth, during the dead time T2 of the plateau preceding the next sawtooth, the processor reads the value of each of the n numbers of M2, divides it by the number k of recorded sawteeth and then stores in the memory M3 the mean value of the k sawteeth. This mean value is subtracted, sample by sample, from a number m (m<k) of the samples of the most recent sawteeth stored in the memory M1, and the results of such subtraction are stored in the memory M4. In order to limit the amount of computation to within a reasonable bounds, m may be equal to 100 for example. The fixed echoes having thus been removed, the processor 11 which for that matter, may be the processor PR, applies to the digital signals stored in M4 the standard detection criteria described elsewhere and, if successful, computes the altitude H from these same signals. If unsuccessful, the same operation can be effected over the last 200 or more sawteeth. This augments the volume of computation, the capacity of the memory M4 and the signal processing, work, but, enables to measure an altitude H which would otherwise be impossible or too imprecise because of too small a number of sawteeth. In this first variant of the invention it is assumed that the processor is fast enough to perform the operations described hereinbefore for the period of time T2 of each plateau, and this period of time T2 may be extended to over 500 μs if necessary. These operations may be commenced at take-off of the aircraft, once 100 sawteeth have been recorded.

According to a second simplified variant, progressively erasing previous values in the memories M1 and M2 is no longer necessary: once the memories M1 and M2 are full their contents are frozen, and the samples of the analog signal $Fb_t$ are no longer taken into account during the time necessary for computation and filling of the memories M3 and M4 and for the determination of the altitude H. In this case, where the period of time T2 of the plateau is no longer a limiting factor, it is advisable to take values which are sufficiently high for the parameters k and m, for example: k=256 and m=200. At the end of a cycle in which H is to be measured, lasting between 50 and 150 ms approximately, the contents of the four memories M1 to M4 are deleted and a new measuring cycle for the altitude H is started. When introducing the necessary adaptations, which are within grasp of the average computer expert, the circuit shown in FIG. 2 as to be described hereinbelow makes it possible to use the two variants of the invention which will be described hereinafter.

In addition to the elements that have already been described, the circuit of FIG. 2 comprises a clock generator 14, having a frequency of, for example, 250 kHz, connected to a synchronizing circuit 15 which further receives the signal S1, and to an input of an AND circuit (AND gate) 16 of which the second input receives a logic signal L1 from the processor PR. The output of circuit 15 controls the functioning (S1 at "1") or the non-functioning (S1 at "0") of the analog-to-digital converter 13 so that the sampling instants are always the same relative to the start of each sawtooth. In the Figure the multiple conductors are referenced by slanting lines with the number of conductors taken by way of example stated against them. The AND gate 16 transmits clock pulses to a counter C2 (n-counter) during the "high" state of the signal L1 partly shown in FIG. 3. During the period of time T1, the counter C2 in the write mode addresses the memory M2 directly and each zone of memory M1 indirectly by means of an AND gate 17 and an OR gate 18. The addressing of the zones (incrementation by unity at each sawtooth) is effected directly from processor PR over an address conductor 19. The output signal of the analog-to-digital converter 13 is supplied directly to the memory M1 and indirectly by means of an adder 20, an AND gate 21 and an OR gate 22, to memory M2. The adder 20 receives data from memory M2 on a second input. In order to write the memory M1, the zone addresses (n addresses) are validated through the gates 17 and 18 by a logic signal L3 originating from the processor. In order to write the memory M2, the data produced by the adder 20 are validated through the gates 21 and 22 by a logic signal L2 originating from the processor. Memory M2 is read over the data bus 23 controlled by the signal R2/W2. Similarly, the memory M1 is read over the data bus 24 controlled by the signal R1/W1. For addressing M1 in the read mode all the address wires originate from the microprocessor, bus 19 always being used for zone addressing (m zones) and the points of each zone being addressed under the control of the signal $\overline{L3}$ (inverter 25) by means of a bus 26 validated through an AND gate 27 and the OR gate 18. Memory M3 is connected to the processor PR over a two-way data bus 28, an address bus 29 and a write-read control wire R3/W3. Memory M4 is connected to the processor over a data bus 31, an address bus 32 and a write-read control wire R4/W4. For erasing old values (first variant) there is additionally provided a data bus 33 which is validated by a logic signal L4 through an AND gate 34 and the OR gate 22. In FIG. 2 the different address buses have deliberately been represented separately in order to provide a better representation of the functions in the diagram. The computer expert will be able to translate this diagram into a form which is better adapted to the hardware, more specifically, by using logic circuit selection signals (CS) and bringing non-selected circuits into a high-impedance state. It should be observed, for this matter, that the lines transporting the signals L1, L2, L3, L4 may belong to the data bus of the processor. The number of wires of certain data buses may also be reduced from 20 to 16 when encoding the samples in 8 bits instead of 12 bits.

The circuit of FIG. 2 operates in the following manner:

In order to record the data during each period of time T1, the processor PR receives the signal S1 (see FIG. 3). Over the line transporting the signal L1, also represented in FIG. 3, and through the AND gate 16 the clock pulses transmitted at 14 are fed to the counter C2. For this purpose, the signal L1 which is locked to the ascending edge of S1 has the value "1" during the time T1, that is, during 16 clock pulses, and also during the next 16 clock pulses at the beginning of the plateau (total duration: 2T1). The counter C2 is then incremented from 0 to 15 during the time T1 of the sawtooth, goes to 0 at the end of T1 then describes another cycle from 0 to 15 so that it again reaches 0 at the beginning of the next sawtooth. The counter C2 always supplies the addresses to M2, in the write or read mode. During each period T1 the outputs 36 of M2 connected to the bus 23 are connected to the adder 20 which also receives the output signal of the analog-to-digital converter 13 and produces the sum of the current sample of Fb$_t$ and of the contents of M2 at the address defined by C2 and which corresponds to the running number of the associated sample in the sawtooth. For that matter, during the period of time T1, the signal L2 is set to "1" (and L4 to "0"), which authorizes the sending-back to the data input of M2 of the sum formed by the gates 21 and 22. The gates 21, 22 and 34 are in fact sets of gates passing all wires (generally 20 or 16) which transport the data in parallel. The most significant wires of the address bus of M1 (multiple conductor 19) are connected directly to the address bus of the processor. These address wires receive the running number of the sawtooth, which constitutes a software embodiment of the counter C1 mentioned above. By means of the combination of AND gates 17 and 27, OR gate 18 and inverter 25, upon the command of the control signal L3, the processor PR sends onto the wires carrying the least significant bits of the input of M1 either the output signals of C2, or the signals of conductor 26 of its own address bus. During the period of time T1 of the sawtooth the signal L1 has assumed the "1" state and M1 records the digitised input signal in the zone defined by the processor, the position of each sample in the zone being defined by the counter C2. In this way are stored after k consecutive sawteeth: in M1, k×n input signal samples routed by a multiple conductor 27 and having the form: $S_j^i$, where i varies from 1 to k, and j varies from 1 to n for each value of k; in M2, n sums of samples, each sum being the accumulation of k samples having the same running number corresponding with k sawteeth, that is:

$$\sum_{i=1}^{i=k} S_1^i, \ldots, \sum_{i=1}^{i=k} S_n^i;$$

When it is decided to employ the stored samples in the above-described first or second variant, the processor, which has elsewhere counted the number k of sawteeth, triggers a cycle of the counter C2 (L1 at "1" and R2/W2 in the read position), reads the output signals of M2 and divides them by k. The results are stored in memory M3 (R3/W3 in write position). The division by k may be simplified by adopting for k a value which is a power of 2, for example $2^q$, in which case the division by k consists of suppressing the q least significant bits of each sum. The memory M3 then contains the n values:

$$\frac{1}{k} \sum_{i=1}^{i=k} S_j^i,$$

where j varies from 1 to n. The signal L3 is then set to "0" and R1/W1 into the read position, so that the processor, completely in the read mode, addresses the memory M1, all the values of the locations of M1 are read in succession and the corresponding values removed from M3 (R3/W3 in the read position) are subtracted therefrom, the n (15) values of each zone of M1 corresponding to one of the n values of M3. The results of these computations are stored one by one in the memory M4 (R4/W4 in the write position) thus containing the signal stripped of its fixed echoes in the form of:

$$S_1^1 - \frac{1}{k} \sum_{i=1}^{i=k} S_1^i, \ldots, S_n^1 - \frac{1}{k} \sum_{i=1}^{i=k} S_n^i;$$

$$S_1^2 - \frac{1}{k} \sum_{i=1}^{i=k} S_1^i, \ldots, S_n^2 - \frac{1}{k} \sum_{i=1}^{i=k} S_n^i; \ldots;$$

$$S_1^m - \frac{1}{k} \sum_{i=1}^{i=k} S_1^i, \ldots, S_n^m - \frac{1}{k} \sum_{i=1}^{i=k} S_n^i;$$

$$S_1^k - \frac{1}{k} \sum_{i=1}^{i=k} S_1^i, \ldots, S_n^k - \frac{1}{k} \sum_{i=1}^{i=k} S_n^i$$

It should be observed that the capacity of the memory M4 may be chosen to be smaller than k zones when m zones (m<k) corresponding with m successive sawteeth are considered sufficient to obtain a correct measurement of the altitude H.

For the first variant of the embodiment of the invention it is necessary to delete upon starting each sawtooth the stored samples of the oldest sawtooth (previous by k×Tr). In the memory M1 this deletion may be effected in a very simple way by adopting cyclic addressing, the new sample values will delete the oldest values. For the deletions in the memory M2 the processor addresses in the read mode the corresponding zone of M1 over its data bus (signal L3 at "1"), causes a cycle of C2 (signal L1 at "1" during 16 clock pulses) for addressing all the pockets of this zone of M1 as well as simultaneously all those of M2 in the read mode. The n corresponding values of M1 are subtracted from those of M2 and the result of the operation is returned to M2 (R2/W2 in the read position) over the bus 33 through the gates 34 and 22, while the signal L2 is at "0" and the signal L4 at "1".

For the processing of the samples contained in M4 (measurement of H) it will then be sufficient to read this memory (R4/W4 in the read position), which causes these samples to be transferred to the output terminal S03. Calculation of the altitude H by the processor 11 from such samples may be effected in various conventional ways. A time-frequency transformation of the samples of M4, such as a fast Fourier transform (FFT), for example, produces the spectrum of the cleared signal Fb$_m$, which is a spectrum of lines having relative distances 1/Tr. In this spectrum the line having the largest amplitude is representative of the echo from the ground, which enables to identify same, and its frequency provides the altitude H on the basis of the above formula (1). Another way of precisely determining the frequency of the ground echo is to measure the time (the period of time) passing between two oriented-zero crossings of the quasi sinusoid represented by the samples contained in M4 (signal Fb$_m$) by means of a counter (not shown). This period of time may be obtained with sufficient precision by computing a mean value over a sufficiently large number of periods of the fundamental sine curve of the signal Fb$_m$, for example 100 to 300 periods.

Figure 5:
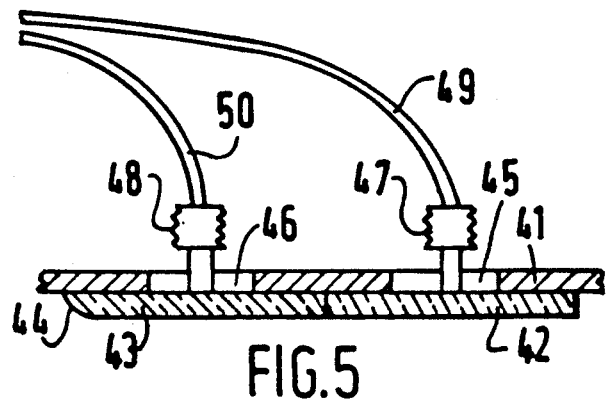
FIG. 5 shows in a sectional view the installation arrangement of the aerials (partly shown) on the aircraft which arrangement can be realised according to the invention.

The signal-to-noise ratio for the ground echo obtained by means of the fixed-echo cancelling unit of FIG. 2 is of the order of 20 to 30 dB. This gain is sufficient to enable the transmitting-receiving aerials to be installed close together, even in contact with each other, on the fuselage of the aircraft, as represented in FIG. 5. This differs from to the prior art, according to which to enable altitude measurements of less than 6 m it is necessary to provide a decoupling of 70 dB between the aerials which in practice requires a distance between them of the order of 50 cm. Two separate serial installations are then necessary, that is, two separate fixtures, resulting in two different leading edges of the aerials, brake generators, and resulting in different lead-throughs of the aerial cables in the fuselage. This is avoided according to the invention, wherein it is possible to bring the aerials into contact with each other because although the decoupling will then be only 50 dB, to that is added the 20 dB mentioned before. Thus a signal-to-noise ratio is obtained which is equal to that obtained according to the prior art. In FIG. 5 is represented 41 the fuselage of the aircraft. The transmitting-receiving aerials 42 and 43 respectively, are realised on a single rectangular printed circuit board of approximately 15 cm by 10 cm, the leading edge of the aerial 43 being rounded off to reduce the drag factor. Two adjacent openings 45 and 46 in the fuselage pass the respective connectors 47 and 48 to which are coupled the coaxial supply lines 49 and 50 to the aerials.

Figure 6:
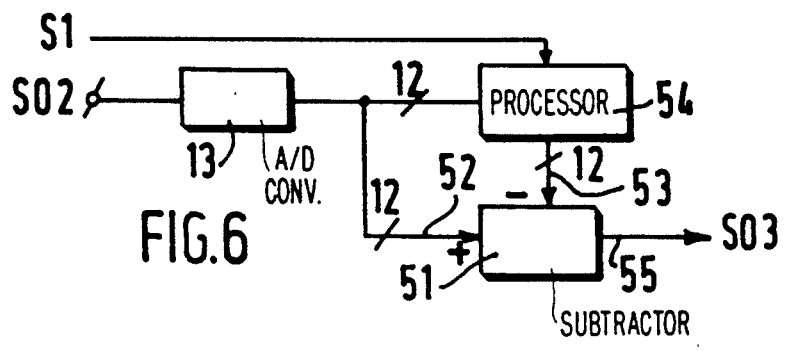
FIG. 6 represents a simplified embodiment of the invention.

FIG. 6 represents a simplified embodiment of the invention for which the number m is chosen to be equal to 1, that is to say, upon initiating each new sawtooth the signal representative of the fixed echoes as computed by the system of FIG. 2 is subtracted from the signal SO2. This subtraction is simply performed by means of a subtractor 51 whose increment input 52 is connected to the output of analog-to-digital converter 13 and whose decrement input 53 is connected to the processing means 54 for computing the signal caused by fixed echoes, which means comprises the elements C2, M1, M2, M3 and PR in FIG. 2, the latter being connected specifically by means of the data bus 28 of memory M3. The output 55 of the substractor 51 is connected to the terminal SO3 of unit 11 of FIG. 4, on which it supplies, for each sawtooth, n difference signals:

$$S_j^1 - \frac{1}{k}\sum_{i=1}^{i=k} S_j^i,$$

where j varies from 1 to n.

Figure 4:
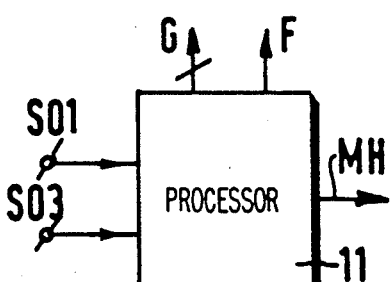
FIG. 4 represents a unit for measuring the altitude H on the basis of the beat frequency signal.

It should be observed that for this simplified embodiment the subtraction of the echo signal and the fixed echo signal may be performed in the analog mode (in a manner not shown). For this purpose, an analog subtractor should be available whose increment input is connected to the terminal SO2, whose decrement input is connected to the output of a digital-to-analog converter receiving the bus 28 from the memory M3 (FIG. 2), and whose output is connected to the terminal SO1 of the unit 11 (FIG. 4).

It should finally be observed that the invention is not restricted to radio altimeters in which the sawtooth has a fixed duration. For radio altimeters having a sawtooth having a variable period of time T1, the sampling may be effected not at fixed time intervals determined by a clock but when the sawteeth exceed predetermined thresholds on the ordinate axis. In this embodiment (not shown) the signal DDS (FIGS. 1 and 3) is supplied to a second analog-to-digital converter whose output value changes at each exceeding of a new threshold and thus varies from 0 to n. The output of this second converter thus supplies directly the addresses of the memories M1 and M2, thus ensuring also the function of the counter C2 (FIG. 2).

I claim:

1. A fixed-echo cancelling radio altimeter for use in an aircraft for measuring low altitudes, comprising:
    means for generating a linearly frequency-modulated signal in the form of a series of identical sawteeth separated by plateaus;
    means for transmitting to the ground a wave corresponding to said frequency-modulated signal and which is reflected back as an echo wave;
    means for receiving said echo wave and mixing it with a portion of the transmitted wave so as to derive a beat frequency signal $Fb_t$ which corresponds to the frequency difference between the transmitted wave and the echo wave, said signal $Fb_t$ being representative of the accumulation of fixed and mobile components of said echo waves;
    digitizing means for sampling the beat frequency signal $Fb_t$ at fixed time intervals following the start of each sawtooth so as to derive n samples of such signal per sawtooth;
    a first memory (M1) for storing the n×k samples $S_j^i$ of k successive sawteeth, where i varies from 1 to k and j varies from 1 to n;
    a second memory (M2) for storing n sums of said samples, each such sum being the accumulation of corresponding samples of the k successive sawteeth, of the form:

$$\sum_{i=1}^{i=k} S_1^i, \ldots, \sum_{i=1}^{i=k} S_n^i;$$

first computing means for computing the n mean values of said n sums:

$$\frac{1}{k}\sum_{i=1}^{i=k} S_1^i, \ldots, \frac{1}{k}\sum_{i=1}^{i=k} S_n^i;$$

each such mean value being a fixed echo component $Fb_f$ of said beat frequency signal $Fb_t$;
    a third memory (M3) for storing said n mean sum values; and
    further computing and storage means for computing the n×m differences $Fb_t - Fb_f$ of a number m (m ≦ k) of said samples of said beat frequency signal $Fb_t$ and supplying signals corresponding to such differences, such difference signals constituting the mobile echo components $Fb_m$ of said samples of the signal $Fb_t$; and
    means for determining from each of said mobile echo components $Fb_m$ the altitude H corresponding thereto, in accordance with:

$$H = \frac{c}{2} \frac{T1}{\Delta F} Fb_m$$

where c is the velocity of an electromagnetic wave in air, and T1 and $\Delta F$ are respectively the duration and frequency range of each of said sawteeth.

2. A radio altimeter as claimed in claim 1, wherein said further computing and storage means comprises:
    second computing means for computing said n×n differences in accordance with:

$$S_1^1 - \frac{1}{k}\sum_{i=1}^{i=k} S_1^i, \ldots, S_n^1 - \frac{1}{k}\sum_{i=1}^{i=k} S_n^i,$$

$$S_1^2 - \frac{1}{k}\sum_{i=1}^{i=k} S_1^i, \ldots, S_n^2 - \frac{1}{k}\sum_{i=1}^{i=k} S_n^i,$$

$$S_1^m - \frac{1}{k}\sum_{i=1}^{i=k} S_1^i, \ldots, S_n^m - \frac{1}{k}\sum_{i=1}^{i=k} S_n^i; \text{ and}$$

a fourth memory (M4) to store and supply at its output the n×m differences representing the mobile echo components $Fb_m$ for m successive sawteeth.

3. A radio altimeter as claimed in claim 2, wherein the said first and second computing means and memories M1, M2, M3, M4 are constituted by a processor (PR) and four RAMs.

4. A radio altimeter as claimed in claim 1, wherein said further computing and storage means comprises a subtractor to compute n differences for each sawtooth as follows:

$$S^j - \frac{1}{k}\sum_{i=1}^{i=k} S^j,$$

in which j varies from 1 to n, and to produce at its output the n differences which represent mobile echo components $Fb_m$ of each sawtooth; said subtractor being connected at its increment input to the output of said digitising means and at its decrement input to an output data bus of said third memory (M3).

5. A radio altimeter as claimed in claims 1 or 2, wherein the operations of sample storage and computation are effected by said first and second computing means when said first and second memories are full, after which the information in said first and second memories are deleted and a new altitude measuring cycle is commenced.

6. A radio altimeter as claimed in claims 1 or 2, further comprising means for deleting in said first and second memories during each period of said sawtooth the information stored therein relating to the oldest sawtooth.

7. A radio altimeter as claimed in claim 6, wherein the operations of sample storage and computation are effected by said first and second computing means and memories M1, M2, M3, 8. A radio altimeter as claimed in claims 1 or 2, wherein said digitising means comprises a clock signal generator, an analog-to-digital converter receiving the clock signal, and synchronizing means for synchronizing the sampling instants relative to the instant which marks the beginning of each sawtooth.

9. A radio altimeter as claimed in claim 8, further comprising a cycle counter having the capacity n and controlled by said clock generator for addressing in the write mode said first memory M1 and addressing in the read and write modes said second memory M2.

* * * * *